PATENT OFFICE.

JOSEF PATTIGLER, OF VIENNA, AUSTRIA-HUNGARY, ASSIGNOR TO ALFRED RITTER VON PISCHOF, OF SAME PLACE.

PLASTIC COMPOSITION.

SPECIFICATION forming part of Letters Patent No. 529,876, dated November 27, 1894.

Application filed June 30, 1894. Serial No. 516,217. (No specimens.)

*To all whom it may concern:*

Be it known that I, JOSEF PATTIGLER, a subject of the Emperor of Austria-Hungary, residing at Vienna, Austria-Hungary, have invented certain new and useful Improvements in Plastic Compositions, of which the following is a specification.

My invention relates to the manufacture of a composition for various purposes in the arts.

The principal object of my invention is to provide a simple, inexpensive, durable and efficient compound partaking somewhat of the nature of india rubber, but adapted for many uses other than those to which india rubber and like products are applicable with good effects in the different arts.

My invention consists of a composition consisting of the ingredients and compounded in substantially the manner hereinafter described and claimed.

The nature, objects and general scope of my invention will be more fully understood from the following description of one preferred method of compounding the composition of my invention with some of the applications thereof in the different arts.

A charge of linseed oil is placed in preferably a steam heated kettle or the like and boiled until bubbles are formed therein, when there are added successively thereto forty parts of Vienna white or caustic, ten parts of lime, twenty parts of hydraulic cement and ten parts of plaster of paris, and after the separate and several admixtures of the above ingredients have been made thereto and the mass has been brought to a more or less consistent mass, sawdust or powdered pumice stone is added in such quantities as to produce the necessary hardness of structure, and then five to ten parts of soluble glass, these ingredients being so combined therewith as to produce an intimate admixture or homogeneous compound for various uses in the arts, which will be hereinafter more fully explained. In case a composition of greater hardness and tenacity is required for various uses, then there are added to the mass ten to fifteen parts, more or less, of pulverized fire brick, quartz, flint or the like, and which as practice has demonstrated gives an excellent product.

It may be here remarked that the hereinbefore described composition is especially adapted for molding casts, terra cotta and stucco work, busts and other technical purposes; and is especially adapted on account of its susceptibility to become very hard and owing to its water proof nature, for plastics, such as building material, cornices, moldings and as a substitute for caoutchouc, gutta percha, linoleum and for the manufacture of door mats and other somewhat similar articles. The above described composition is water proof and is not inflammable, and while it readily carbonizes, yet in the presence of an intense heat or flame, such will have no effect upon the same.

It will be obvious to those skilled in the art to which my invention appertains, that the proportions of ingredients entering into the composition of the compound hereinbefore described, may be varied without departing from the spirit of my invention; and hence I do not wish to be understood as limiting myself to the precise proportions of the said materials as mentioned; but

Having thus described the nature and objects of my invention, what I claim as new, and desire to secure by Letters Patent, is—

A plastic composition, composed of vegetable or mineral oil, Vienna white or caustic, lime, cement, plaster of paris, sawdust and soluble glass, substantially as and for the purposes set forth.

In testimony whereof I have hereunto set my signature in the presence of two subscribing witnesses.

JOSEF PATTIGLER.

Witnesses:
ANTON HÖHR,
HARRY BELMONT.